United States Patent
Heine et al.

(10) Patent No.: US 8,406,451 B2
(45) Date of Patent: Mar. 26, 2013

(54) CAPACITIVE ELECTROACOUSTIC TRANSDUCER AND MICROPHONE

(75) Inventors: Lars Heine, Braunschweig (DE); Raimund Staat, Burgwedel (DE); Claus-Peter Hinke, Burgdorf (DE)

(73) Assignee: Sennheiser electronic GmbH & Co. KG, Wedemark (DE)

(*) Notice: Subject to any disclaimer, the term of this patent is extended or adjusted under 35 U.S.C. 154(b) by 607 days.

(21) Appl. No.: 12/532,404

(22) PCT Filed: Mar. 3, 2008

(86) PCT No.: PCT/EP2008/053381
§ 371 (c)(1),
(2), (4) Date: Feb. 23, 2010

(87) PCT Pub. No.: WO2008/116828
PCT Pub. Date: Oct. 2, 2008

(65) Prior Publication Data
US 2010/0177926 A1  Jul. 15, 2010

(30) Foreign Application Priority Data
Mar. 23, 2007 (DE) .................. 10 2007 014 577

(51) Int. Cl.
*H04R 1/00* (2006.01)
*H04R 25/00* (2006.01)
(52) U.S. Cl. .............. 381/399; 381/176; 381/174
(58) Field of Classification Search ........ 381/365, 381/369, 174, 190, 399, 424, 113, 91, 355, 381/173, 176
See application file for complete search history.

(56) References Cited

U.S. PATENT DOCUMENTS 3,646,280 A * 2/1972 Tamura et al. .......... 381/191
3,778,561 A * 12/1973 Reedyk .................. 381/113

FOREIGN PATENT DOCUMENTS

| DE | 3003178 A1 | 1/1980 |
|---|---|---|
| DE | 430725 A1 | 3/1993 |
| GB | 1428844 A1 | 3/1976 |
| GB | 2037537 A | 7/1980 |
| GB | 2400769 A | 10/2004 |
| WO | WO 2005/115052 A | 12/2005 |

OTHER PUBLICATIONS

International Search Report for PCT/EP2008/053381 mailed on Jun. 7, 2008; 6 pages.
Written Opinion for PCT/EP2008/053381 mailed on Jun. 7, 2008; 9 pages.

\* cited by examiner

*Primary Examiner* — Curtis Kuntz
*Assistant Examiner* — Sunita Joshi
(74) *Attorney, Agent, or Firm* — Kilpatrick Townsend & Stockton LLP

(57) ABSTRACT

There is provided a capacitive electro-acoustic transducer comprising an active diaphragm (20) and a first and a second diaphragm carrier (60). The active diaphragm (20) is accommodated between the first and second diaphragm carriers (60). The first and second diaphragm carriers (60) each have a respective flat electrode (30). The diaphragm carrier and the electrode are connected together in such a way that the diaphragm carrier projects beyond the electrode by a predetermined amount.

17 Claims, 2 Drawing Sheets

CAPACITIVE ELECTROACOUSTIC TRANSDUCER AND MICROPHONE

CROSS-REFERENCE TO RELATED APPLICATIONS

Figure 1C:
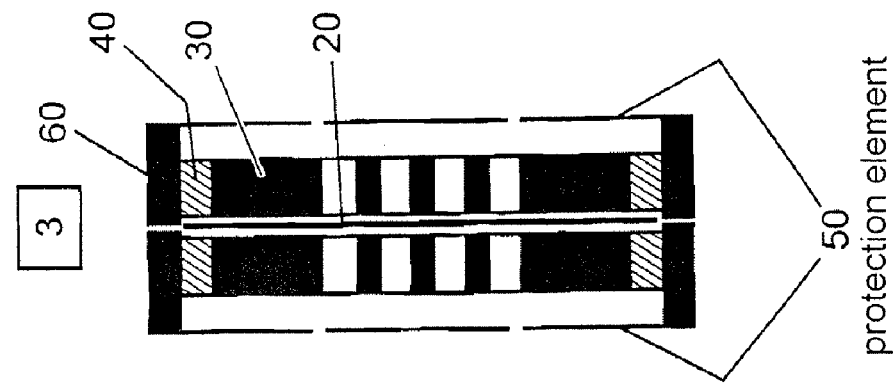

This application is a U.S. National Stage of PCT Application No. PCT/EP2008/053381 filed Mar. 20, 2008, which claims the benefit of the German Application No. 102007014577.4 filed Mar. 23, 2007, the contents of both applications hereby incorporated by reference in their entirety.

The present invention concerns a capacitive electro-acoustic transducer and a corresponding microphone.

In the case of microphone capsules which operate on the capacitor principle, that is to say a microphone capsule with a capacitive electro-acoustic or recording transducer effective protection must be provided from impurities, foreign particles (dust and drops of moisture) for the internal parts of the microphone capsule. In that respect however it is to be noted that the sound to be recorded by the microphone capsule must pass unimpededly into or to the sound-converting regions of the microphone capsule. Regions of the microphone capsule, which are to be particularly protected, are for example the electrical insulation of the electrode and the air gap between the active diaphragm and the electrode. That air gap is typically a few micrometers in width and is typically accessible through openings in the electrode. If a foreign body passes into the air gap it can influence or hinder free oscillation of the active diaphragm. The result of such a foreign body can also be that interference signals are produced.

If the microphone capsule is in the form of an acoustic pressure receiver then the rearward side of the transducer, that is to say on the side of the electrode, can be closed by a suitably sized volume. The other side of the transducer, that is to say the front side, must be freely accessible to the sound to be recorded. The air gap is typically protected by the active diaphragm from the front side of the transducer.

If the microphone capsule is in the form of a transducer system of symmetrical structure, there is provided a diaphragm arranged between two electrodes, that is to say the arrangement has an additional electrode. Such transducer systems of symmetrical structure are particularly advantageous in terms of professional recording technology so that the higher level of structural complication and expenditure is certainly justified. It is to be noted in that respect however that the sensitive regions of the microphone capsule are to be protected from ambient influences. That is effected for example by the provision of a non-woven fabric. In that arrangement the non-woven fabric is disposed immediately outside on the electrodes. That fabric must however be very fine to provide an adequate mechanical filtering effect. On the other hand however the fabric causes serious acoustic losses so that the sound can pass through the fabric only at those locations at which the electrode has openings.

Such a design configuration however provides that only the air gap but not the insulation of the electrode can be protected from contamination. To ensure robustness of a capacitive transducer however the insulation of the electrode must also be protected from contamination so that the microphone can also be used for example in the open air.

Therefore the object of the present invention is to provide a capacitive electro-acoustic transducer which ensures improved protection for the sensitive components.

That object is attained by a capacitive electro-acoustic transducer as set forth in claim 1.

Thus there is provided a capacitive electro-acoustic transducer comprising an active diaphragm and a first and a second diaphragm carrier. The active diaphragm is accommodated between the first and second diaphragm carriers. The first and second diaphragm carriers each have a respective flat electrode. The diaphragm carrier and the electrode are connected together in such a way that the diaphragm carrier projects beyond the electrode by a predetermined amount.

In accordance with an aspect of the present invention the first and second diaphragm carriers have a first side which projects by a first spacing beyond a first side of the electrode. The second side of the diaphragm carrier projects by a second spacing beyond the second side of the electrode.

In accordance with a further aspect of the present invention the first and second electrodes each have at least one sound-transmissive opening.

In accordance with an aspect of the present invention the capacitive electro-acoustic transducer has at least one protection unit provided at the second side of the diaphragm carrier for concealing the second side of the electrode.

The present invention concerns the notion of providing a capacitive electro-acoustic transducer comprising a diaphragm and two elements arranged symmetrically relative to the diaphragm. Those symmetrical elements in that arrangement each have a respective diaphragm carrier which both fixes the diaphragm and also encloses a flat electrode at its periphery. In that case the diaphragm carrier and the electrodes are connected together in such a way that they are not disposed in one plane. In this case the diaphragm carriers project with respect to the electrode or the diaphragm carriers extend beyond the electrodes so that a step is formed and so that the electrode is at a sufficient spacing relative to the diaphragm, by which an air gap is formed.

The present invention also concerns the notion of providing a protection element at at least one side of the capacitive electro-acoustic transducer. The protection element can represent a substantially closed element with small openings, wherein the openings are of such a configuration that they are sound-transmissive but do not allow contamination to pass through. The protection element is arranged at least one of the two sides of the capacitive electro-acoustic transducer in such a way that there is a spacing relative to the electrode. The protection element can be in the form of a diaphragm. The protection element can also be in the form of a diaphragm with small openings in such a way that the diaphragm is sound-transmissive but does not allow contamination to pass therethrough. In addition thereto the protection elements can be of an electrically conducting nature and can be electrically conductingly connected to the active diaphragm.

Further configurations of the invention are subject-matter of the appendant claims.

Embodiments by way of example and advantages of the present invention are described in greater detail hereinafter with reference to the Figures.

Figure 1B:
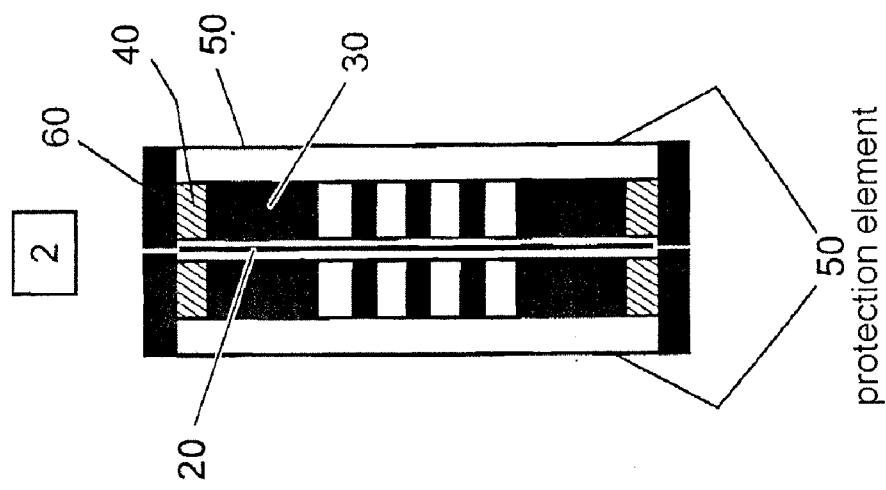
Figure 1A:
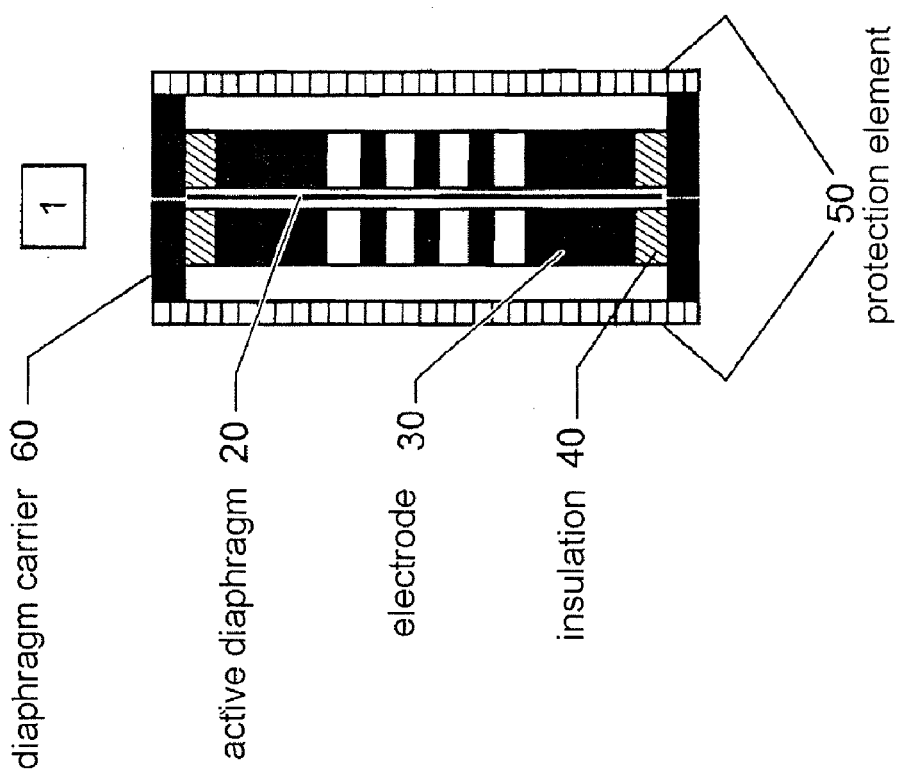
Figure 2:
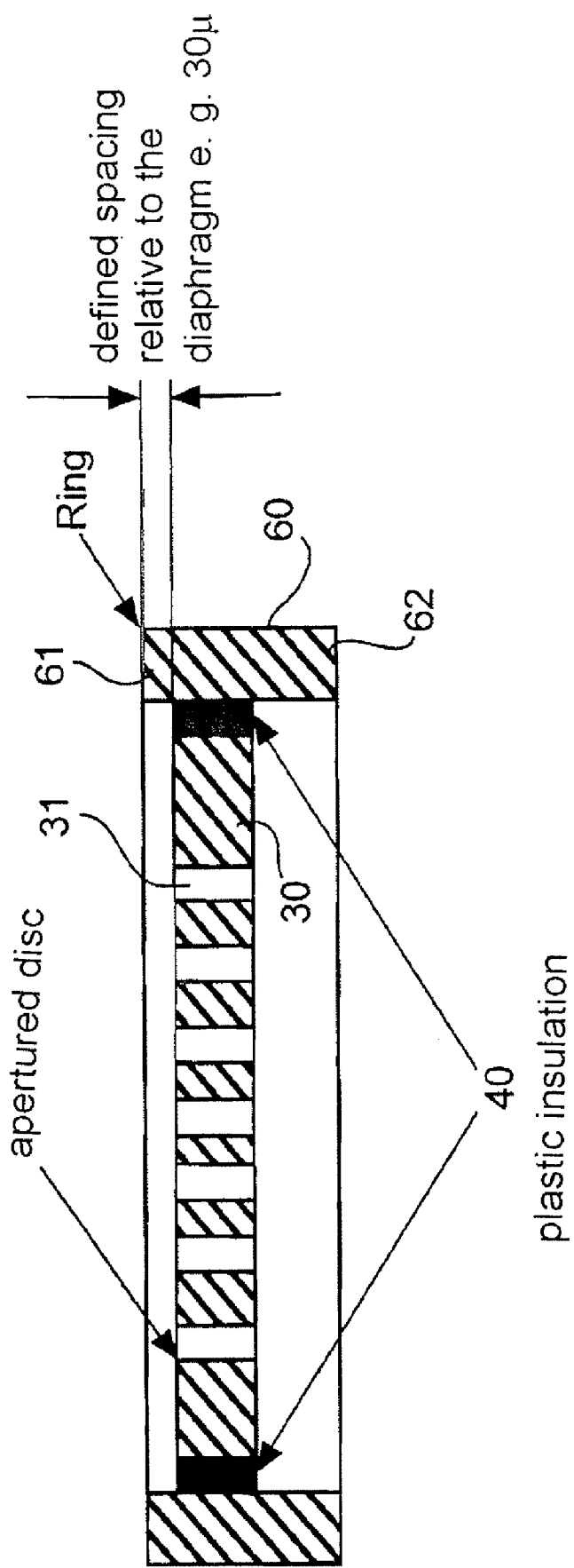

FIG. 1a shows a diagrammatic view of a capacitive electro-acoustic transducer according to a first embodiment, FIG. 1b shows a diagrammatic view of a capacitive electro-acoustic transducer according to a second embodiment, FIG. 1c shows a diagrammatic view of a capacitive electro-acoustic transducer according to a third embodiment, and FIG. 2 shows a sectional view of a protection element according to an embodiment of the invention.

The capacitive electro-acoustic transducers described hereinafter can be provided for example in a microphone or a microphone capsule.

FIG. 1a shows a diagrammatic view in section of a capacitive electro-acoustic transducer according to a first embodiment. The capacitive electro-acoustic transducer 10 has an active diaphragm 20, two electrodes 30, insulation units 40 and two diaphragm carriers 60. Provided between the two electrodes 30 is the active diaphragm 20 which is held by the two diaphragm carriers. The two diaphragm carriers 60 each accommodate a respective one of the electrodes. A respective insulation unit 40 is provided between the electrodes 30 and the diaphragm carrier 60. The active diaphragm 20 is carried or held by the diaphragm carrier 60. In that case the diaphragm carrier has a first side 61 for holding the active diaphragm and a second side 62. The diaphragm carrier 60 is of such a configuration that it projects at its second side 62 beyond the electrode 30 by a predetermined amount. A protection element 50 can be provided at the second side 62. Thus a respective protection element 50 can be provided on both sides of the capacitive electro-acoustic transducer.

The capacitive electro-acoustic transducer in the first embodiment is suitable in particular for a pressure gradient receiver having for example a kidney-shaped directional characteristic. With such a design configuration the original transmission behaviour of a capacitive electro-acoustic transducer, without protection elements, is only slightly influenced. That can be explained on the basis that the capacitive electro-acoustic transducer must already overcome considerable acoustic resistances in the air gap (between the active diaphragm 20 and the electrode 30). The losses caused by the provision of the protection elements 50 contribute to the overall losses, only to a slight extent.

In accordance with the first embodiment the protection element 50 can be in the form of a substantially closed protection element, in which case there are provided small openings which are adapted to transmit sound but not to allow contamination to pass therethrough. The protection element 50 in the first embodiment can represent for example a cloth, for example a non-woven fabric, or an apertured disc, or can be made from a porous material.

FIG. 1*b* shows a diagrammatic view in section of a capacitive electro-acoustic transducer according to the second embodiment. In this case the structure of the capacitive transducer in the second embodiment substantially corresponds to that of the capacitive transducer of the first embodiment. Thus the capacitive electro-acoustic transducer has an active diaphragm 20 between two electrodes 30. The electrodes 30 are respectively connected to a diaphragm carrier 60 by way of insulation units 40. The diaphragm carrier 60 serves to receive the active diaphragm 20.

The second embodiment also provides protection elements 50 at the second sides of the diaphragm carrier 60.

The protection elements 50 in the second embodiment are for example in the form of a diaphragm. The fact that the second side of the diaphragm carrier 60 projects beyond the electrode 30 means that the protection element 50 can be excited to oscillate by sound waves.

The capacitive acoustic transducer in the second embodiment can be used in particular as a pressure receiver. In this case the diaphragm of the transducer is very stiff so that a low level of stiffness of the additional diaphragms (protection elements 50) is not crucial. The capacitive electro-acoustic transducer of the second embodiment is advantageous in particular when complete sealing of the transducer both in relation to contaminating impurities and also water vapour is desired.

FIG. 1*c* shows a diagrammatic view in section of a capacitive transducer according to a third embodiment. In this case the structure of the capacitive transducer of the third embodiment substantially corresponds to that of the capacitive transducers of the first or second embodiment. Only the protection elements 50 of the third embodiment differ from the protection elements 50 of the first or second embodiment. The protection elements in the third embodiment have a diaphragm having small openings which are of such a nature that they are sound-transmissive but do not allow contamination to pass therethrough. The configuration of the second side 62 of the diaphragm carrier 60 ensures that there is a predetermined spacing between the electrode 30 and the protection element 50.

The capacitive electro-acoustic transducer in the third embodiment thus substantially corresponds to a combination of the capacitive electro-acoustic transducer in accordance with the first and second embodiments. More precisely the protection element 50 of the third embodiment corresponds to a combination of the protection elements of the first and second embodiments.

The capacitive transducer of the third embodiment can be implemented for example in a pressure gradient receiver, wherein that receiver has a kidney-shaped directional characteristic and wherein the frequency response characteristic and the directional effect, in particular at low frequencies, can be deliberately and specifically enhanced, or reduced. That can be effected for example by the provision of the openings or by the configuration of the openings.

The protection elements of the first, second or third embodiment can be of an electrically conducting nature. Preferably the protection elements are also electrically conductingly connected or coupled to the active diaphragm.

FIG. 2 shows a diagrammatic view in section of a diaphragm carrier. That diaphragm carrier can be used as a diaphragm carrier in the first, second or third embodiment and is for example in the form of a system disc and has a first side 61 and a second side 62. The first side 61 serves in that respect to accommodate the active diaphragm of the electro-acoustic transducer. The first side 61 in that case is of such a configuration that it projects beyond the first side of the electrode by a first spacing. That defined spacing can be for example 30 micrometers. The second side 62 of the diaphragm holder 60 is also of such a configuration that it projects beyond the second side of the electrode by a predetermined amount.

The electrode 30 can have a multiplicity of holes 31 so that the electrode can be in the form of an apertured disc. Respective plastic insulations 40 are provided between the electrode and the diaphragm holder 60.

The diaphragm holder 60 can be for example in the form of a ring. The ring and the apertured disc can be for example injected or cast in position.

Two of the diaphragm carriers 60 are required for a symmetrical capacitive electro-acoustic transducer, wherein an active diaphragm 20 is arranged between the first side 61 of a first diaphragm carrier 60 and the second side 61 of a second diaphragm carrier. In this case the two diaphragm carriers can be connected for example by the active diaphragm by means of adhesive.

The protection elements 50 are respectively arranged at the second side 62 of the diaphragm carrier 60. That can be effected for example by an elastic adhesive film. In this case the adhesive film can at the same time compensate for tolerances.

Thus the capacitive electro-acoustic transducer has an active diaphragm held between two diaphragm carriers of a symmetrical configuration. A respective flat electrode is provided in each of the diaphragm carriers. The diaphragm carrier has a first side for accommodating the active diaphragm and a second side projecting beyond the electrode. In that case the electrodes can have openings through which sound can pass to the active diaphragm. The diaphragm carrier is of such a configuration that both its first and its second side project beyond the electrode. A preferably disc-shaped protection element can be arranged at the second side of the diaphragm carrier, the protection element thereby concealing a rearward surface of the electrodes. The protection element can have at least one opening which is sound-transmissive but does not allow contamination to pass therethrough. The protection element can also be in the form of a diaphragm without holes. The protection element can further be in the form of a diaphragm having at least one opening, wherein the opening is sound-transmissive and does not allow contamination to pass therethrough. The diaphragm carrier can have slots through which an electric line can be passed to the electrodes accommodated by the diaphragm carrier. An insulation unit is provided between the diaphragm carrier and the electrode. The active diaphragm can be electrically conducting on both sides. The diaphragm can have an electrical contact with the diaphragm carrier. Diaphragm carriers and the active diaphragm can be glued together. The two diaphragm carriers can be screwed together to fix the active diaphragm. The diaphragm carrier and the electrode can be connected together by way of an insulating plastic, that is to say the insulating plastic serves as an insulation unit.

As an alternative thereto the electrodes can be supported by way of an insulating carrier, wherein a conducting coating is provided on the insulating carrier. A sound-transmissive damping element can be arranged on the electrodes. It is possible to arrange on the second side of the diaphragm carrier an element which covers the electrode and which forms a volume towards the electrode. That element can optionally have at least one sound opening towards the electrode. That opening can be closed for example by a sound-damping element.

A non-woven fabric can be provided in the above-described capacitive transducer between the electrode and the protection element 50, wherein the fabric preferably covers over the entire surface area of the electrode. In that arrangement the fabric does not cover the surface of the insulation units 40.

Thus there is provided a capacitive electro-acoustic transducer having an active diaphragm and a first and a second diaphragm carrier. The active diaphragm is accommodated between the first and second diaphragm carriers. The first and second diaphragm carriers each have a flat electrode, wherein the diaphragm carrier and the electrode are connected together in such a way that the diaphragm carrier projects beyond the electrode by a predetermined amount. The diaphragm carrier has a first side which projects beyond a first side of the electrode by a first predetermined spacing and a second side which projects beyond the second side of the electrode by a second spacing. The first and second electrodes each have at least one respective sound-transmissive opening. The capacitive electro-acoustic transducer can have at least one protection unit provided at the second side of the diaphragm carrier for concealing the second side of the electrode. In that case the protection element can have at least one opening which is sound-transmissive and does not allow contamination to pass therethrough. In that case the protection element can be in the form of a diaphragm or can have a diaphragm. The diaphragm can have at least one opening which is sound-transmissive and does not allow contamination to pass therethrough.

The diaphragm carrier and the electrode are electrically conducting but electrically insulated from each other. The active diaphragm can be electrically conducting on both sides. The diaphragm carrier and the active diaphragm can be electrically connected together. The active diaphragm and the diaphragm carrier can be glued together. The first and second diaphragm carriers can be screwed together so that the active diaphragm is fixed. The diaphragm carrier and the electrode can be connected together by way of insulating plastic material. The electrodes can have an insulating carrier and at least one electrically conducting coating. The capacitive electro-acoustic transducer can have a sound-transmissive damping element disposed on one of the electrodes.

The invention claimed is:

1. A capacitive electro-acoustic transducer comprising:
an active diaphragm, and
a first and a second diaphragm carrier, wherein the active diaphragm is accommodated between the first and second diaphragm carriers,
wherein the first and second diaphragm carriers each have a respective flat electrode and an insulating carrier arranged between the diaphragm carrier and the electrode, wherein the diaphragm carrier encloses the electrode, the diaphragm carrier and the electrode are electrically conducting and are electrically mutually insulatedly coupled together and are connected together in such a way that the diaphragm carrier has a first side that projects by a first spacing beyond a first side of the electrode and a second side that projects by a second spacing beyond a second side of the electrode, wherein each of the first and second diaphragm carriers and the active diaphragm are electrically coupled together.

2. A capacitive electro-acoustic transducer according to claim 1 wherein each electrode has at least one sound-transmissive opening.

3. A capacitive electro-acoustic transducer according to claim 1 comprising at least one protection unit provided at the second side of the diaphragm carrier for concealing the second side of the electrode.

4. A capacitive electro-acoustic transducer according to claim 3 wherein the protection element has at least one opening which is sound-transmissive and does not allow contamination to pass therethrough.

5. A capacitive electro-acoustic transducer according to claim 4 wherein the protection element has a diaphragm.

6. A capacitive electro-acoustic transducer according to claim 4 wherein the protection element has a diaphragm having at least one opening which is sound-transmissive and does not allow contamination to pass therethrough.

7. A capacitive electro-acoustic transducer according to claim 1 wherein the active diaphragm is electrically conducting on both sides.

8. A capacitive electro-acoustic transducer according to claim 1 wherein the active diaphragm and the diaphragm carrier are glued together.

9. A capacitive electro-acoustic transducer according to claim 1 wherein the first and second diaphragm carriers are screwed together and thus fix the active diaphragm.

10. A capacitive electro-acoustic transducer according to claim 1 wherein the diaphragm carrier and the electrode are connected together by way of an insulating plastic.

11. A capacitive electro-acoustic transducer according to claim 1 wherein each electrode has at least one electrically conducting coating.

12. A capacitive electro-acoustic transducer according to claim 1 and further comprising a sound-transmissive damping element disposed on one of the electrodes.

13. A capacitive electro-acoustic transducer according to claim 1 comprising an element for covering the electrode, wherein a volume is formed towards the electrode by the element, wherein the element is arranged at the second side of the electrode.

14. A capacitive electro-acoustic transducer according to claim 13 wherein the element has at least one sound opening towards the electrode.

15. A capacitive electro-acoustic transducer according to claim 14 wherein the sound opening has a sound-damping element.

16. A capacitive electro-acoustic transducer according to claim 1 wherein the first and second diaphragm carriers are of a symmetrical configuration.

17. A microphone having a capacitive electro-acoustic transducer according to claim 1.

* * * * *

UNITED STATES PATENT AND TRADEMARK OFFICE
CERTIFICATE OF CORRECTION

PATENT NO. : 8,406,451 B2
APPLICATION NO. : 12/532404
DATED : March 26, 2013
INVENTOR(S) : Heine et al.

It is certified that error appears in the above-identified patent and that said Letters Patent is hereby corrected as shown below:

In the Specification:

In column 1, line 12, after "applications", please insert --are--.

In column 1, line 18, please insert a --,-- after "transducer".

In column 1, line 21, please insert a --,-- before and after "however".

In column 1, line 25, please insert a --,-- before and after "for example".

In column 1, line 30, please insert a --,-- after "gap".

In column 1, line 34, please insert a --,-- after "receiver".

In column 1, line 47, please insert a --,-- before and after "however".

In column 1, line 49, please insert a --,-- after "effected".

In column 1, line 50, please insert a --,-- after "example".

In column 1, line 51, please insert a --,-- after "arrangement".

In column 1, line 52, please insert a --,-- before and after "however".

In column 1, line 54, please insert a --,-- before and after "however".

In column 1, line 57, please insert a --,-- before and after "however".

In column 1, line 58, please insert a --,-- after "gap".

In column 1, line 58, please insert a --,-- after "electrode".

In column 1, line 60, please insert a --,-- before and after "however".

In column 1, line 62, please insert a --,-- before and after the phrase "for example".

In column 1, line 63, please insert a --,-- after "Therefore".

In column 1, line 64, please insert a --,-- after "transducer".

In column 2, line 1, please insert a --,-- after "Thus".

In column 2, line 9, please insert a --,-- after "invention".

In column 2, line 14, please insert a --,-- after "invention".

Signed and Sealed this
Eighteenth Day of June, 2013

Teresa Stanek Rea
*Acting Director of the United States Patent and Trademark Office*

CERTIFICATE OF CORRECTION (continued)
U.S. Pat. No. 8,406,451 B2

In column 2, line 17, please insert a --,-- after "invention".

In column 2, line 27, please insert a --,-- after "case".

In column 2, line 29, please insert a --,-- after "case".

In column 2, line 40, please delete "arranged at least" and insert --arranged at at least--.

In column 2, line 47, please insert a --,-- after "thereto".

In column 2, line 50, please delete "subject-matter" and insert --the subject-matter--.

In column 2, line 64, please insert a --,-- before and after the phrase "for example".

In column 3, line 4, please insert a --,-- after "20".

In column 3, line 9, please insert a --,-- after "case".

In column 3, line 14, please insert a --,-- after "Thus".

In column 3, line 19, please insert a --,-- before and after the phrase "for example".

In column 3, line 20, please insert a --,-- after "configuration".

In column 3, line 29, please insert a --,-- after "embodiment".

In column 3, line 34, please insert a --,-- before and after the phrase "for example".

In column 3, line 41, please insert a --,-- after "Thus".

In column 3, line 49, please insert a --,-- after "are".

In column 3, line 50, please insert a --,-- after "example".

In column 3, line 56, please insert a --,-- after "case".

In column 3, line 60, please insert a --,-- after "transducer".

In column 3, line 61, please insert a --,-- after "vapour".

In column 3, line 64, please insert a --,-- after "case".

In column 4, line 13, please insert a --,-- after "precisely".

In column 4, line 18, please insert a --,-- before and after the phrase "for example".

In column 4, line 23, please insert a --,-- before and after the phrase "for example".

In column 4, lines 26-27, please insert a --,-- after "Preferably".

In column 4, line 32, please insert a --,-- before and after the phrase "for example".

In column 4, line 35, please insert a --,-- before and after the phrase "in that case".

In column 4, line 37, please insert a --,-- before and after the phrase "for example".

In column 4, line 41, please insert a --,-- after "31".

In column 4, line 45, please insert a --,-- before and after the phrase "for example".

In column 4, line 46, please insert a --,-- before and after the phrase "for example".

In column 4, line 52, please insert a --,-- after "case".

In column 4, line 53, please insert a --,-- before and after the phrase "for example".

In column 4, line 57, please insert a --,-- before and after the phrase "for example".

In column 4, line 57, please insert a --,-- after "case".

In column 4, line 60, please insert a --,-- after "Thus".

In column 4, line 65, please insert a --,-- after "case".

In column 5, line 24, please insert a --,-- after "thereto".

In column 5, line 32, please insert a --,-- before and after the phrase "for example".

In column 5, lines 37-38, please insert a --,-- after "arrangement".

In column 5, line 40, please insert a --,-- after "Thus".

In column 5, line 56, please insert a --,-- after "case".

In column 5, line 58, please insert a --,-- after "case".

<u>In the Claims</u>:

In column 6, line 21, claim 1, please delete "the diaphragm" and insert --and the diaphragm--.